UNITED STATES PATENT OFFICE.

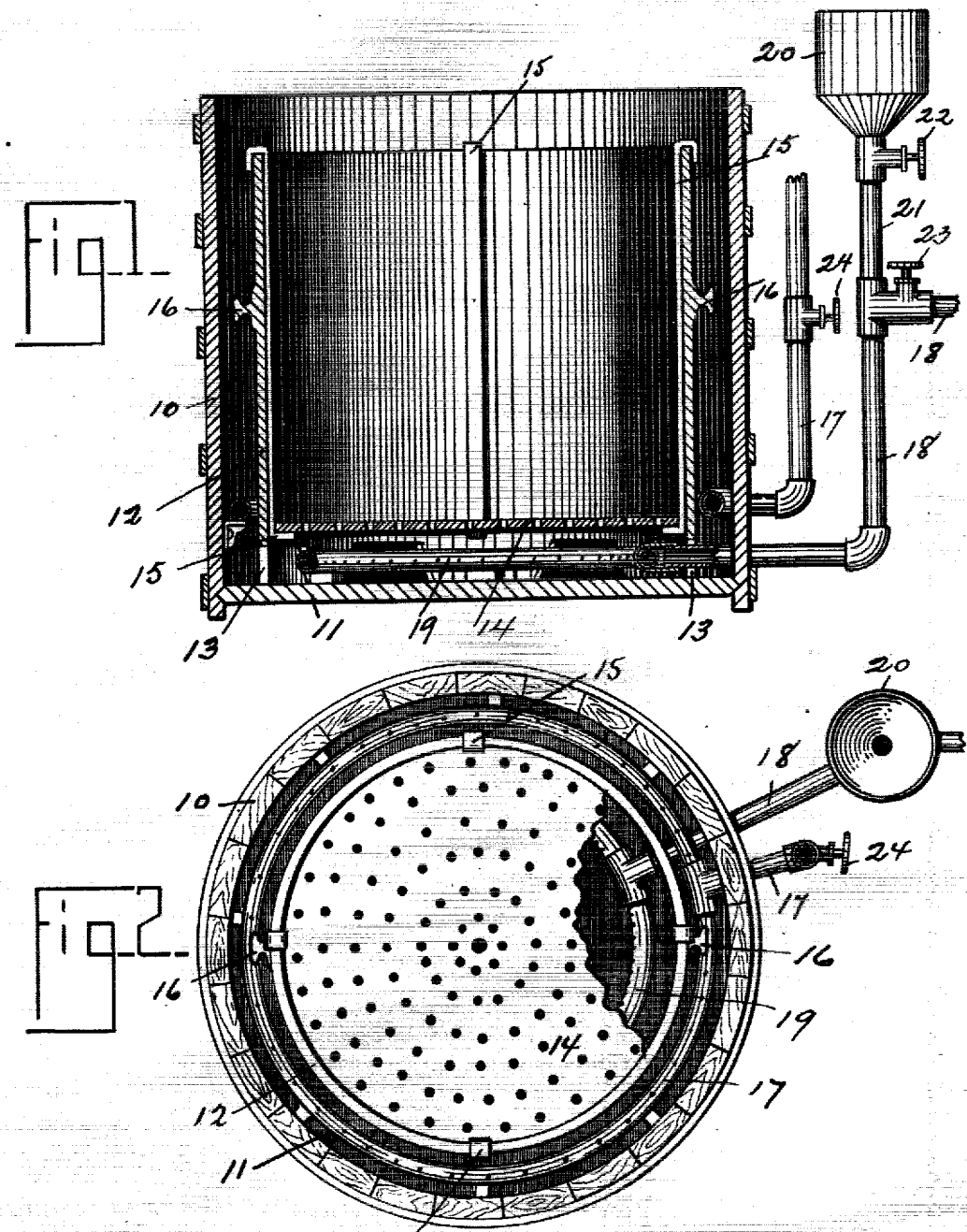

MATTHEW C. CUTTLE, OF NORWICH, CONNECTICUT.

DYER'S VAT.

No. 853,627.

Specification of Letters Patent.

Patented May 14, 1907.

Application filed February 19, 1907. Serial No. 358,240.

*To all whom it may concern:*

Be it known that I, MATTHEW C. CUTTLE, a citizen of the United States, residing at Norwich, in the county of New London and State of Connecticut, have invented a new and useful Improvement in Dyers' Vats, of which the following is a specification.

This invention relates to that class of dyers' vats which include an outer tub or vessel and a removable inner cage adapted to receive the goods to be dyed, and my object is to provide, in connection with such vats, means for readily forcing the dyeing solution through said goods in either direction, that is to say either downward through the cage containing the goods or upward through said cage.

My invention also contemplates improved means for removably supporting the bottom of the cage as well as means for introducing the dyeing solution into the vat, all of which I have explained in detail hereinafter.

In order to explain my invention clearly I have provided the annexed drawings, in which Figure 1 is a central, vertical, sectional view of a dyer's vat embodying my said improvements. Fig. 2 is a plan view of the same, with a portion of the bottom of the inner cage broken away.

Referring now to these drawings, the numeral 10 indicates a tub or vat, here shown as of cylindrical form, having a fixed bottom 11. Within the vat 10 is removably located a cylindrical cage 12 which is designed to receive the goods to be dyed; said cage being so supported upon extensions 13 that considerable space is provided between the bottom of the cage and the bottom of the vat 10. The bottom of the cage 12 is indicated by the numeral 14, said bottom being suspended and supported, on the inturned lower ends of rods 15 whose upper ends are bent to hook over the upper end of the said cage, as is clearly seen in Fig. 1 of the drawings. The lower ends of rods 15 are preferably riveted, or otherwise secured, to the bottom 14.

Whenever it is desired to remove the bottom 14 it is only necessary to lift the upper (hook-shaped) ends of rods 15 from the cage and move said upper ends inward until the hooks are disengaged from the cage when the bottom and connected rods (together with the goods contained in the cage) may drop downward through the cage. After the cage has thus been emptied the bottom 14 may be returned to its operative position by lowering it in the cage until the hooks on rods 15 engage the upper edge of the cage, as seen in Fig. 1.

The bottom 14 is perforated and the cage 10 is preferably provided with trunnions 16 by means of which it may be lifted out of the vat.

17 denotes a steam-pipe which is formed, within the vat, as a perforated ring that is located between the vat and cage, its perforations being located in its upper portion so that steam discharged through said openings will be directed upward.

18 denotes a similar steam-pipe that enters the extreme lower part of the vat and connects with a perforated ring 19, that is located in the space between the cage bottom 14 and the vat bottom 11, the perforations in said ring 19 being preferably at or near the inner side of said ring.

Connected with the pipe 18 is a funnel-shaped receptacle 20 in which the dye solution may be placed and allowed to pass by gravity downward into a pipe 21 that leads into said pipe 18. Having first cut off the return of said solution by closing a valve 22 in pipe 21, a valve 23 in pipe 18 is opened and the in-rushing steam carries with it the said dye-solution and discharges it into the space between the two bottoms and is thence forced upward through the perforations in bottom 14 and through the goods in cage 12; the liquid in said cage being meanwhile caused to over-flow the upper edge of the cage and then pass downward between the cage and vat. After a suitable length of time the valve 23 is closed and a valve 24 in pipe 17 is opened whereupon steam enters the pipe ring that surrounds the cage and is discharged upward through the perforations in the top of said ring. This action creates an upward current in the liquid surrounding the cage and thus forces said liquid over the top of the cage and downward through the goods contained therein. By thus reversing the flow of dye solution and causing it to pass upward and downward through the goods the latter are more uniformly and completely dyed than when the dye is forced therethrough from one direction only. By means of the described funnel 20 additional dye solution may be introduced if desired.

Having thus described my invention I claim:—

In combination in a dyer's vat, an outer vat with a fixed bottom, an inner cage having a perforate bottom, means for supporting said perforate bottom consisting of rods hooked over the upper edge of the cage, a perforate steam pipe between the perforate bottom and the bottom of the outer vat, and a perforate steam pipe surrounding the said cage.

MATTHEW C. CUTTLE.

Witnesses:
FRANK H. ALLEN,
P. C. CUTTLE.